(12) United States Patent
Isayama et al.

(10) Patent No.: US 8,967,424 B2
(45) Date of Patent: Mar. 3, 2015

(54) SEALING STRUCTURE OF FUEL TANK AND VEHICLE PROVIDED WITH SAME

(75) Inventors: Akira Isayama, Wako (JP); Hiroshi Kitamura, Wako (JP); Kotaro Tanaka, Wako (JP); Yu Sato, Wako (JP); Yusuke Miura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/984,707

(22) PCT Filed: Feb. 10, 2012

(86) PCT No.: PCT/JP2012/053076
§ 371 (c)(1),
(2), (4) Date: Aug. 9, 2013

(87) PCT Pub. No.: WO2012/108523
PCT Pub. Date: Aug. 16, 2012

(65) Prior Publication Data
US 2013/0313790 A1 Nov. 28, 2013

(30) Foreign Application Priority Data
Feb. 10, 2011 (JP) .................. 2011-027870

(51) Int. Cl.
*F16J 15/02* (2006.01)
*B60K 15/04* (2006.01)
*B65D 43/02* (2006.01)
*F02M 37/00* (2006.01)

(52) U.S. Cl.
CPC ........... *F16J 15/022* (2013.01); *B65D 43/0222* (2013.01); *B60K 15/0406* (2013.01); *B60K 2015/0451* (2013.01); *F02M 37/0011* (2013.01)
USPC ........... 220/803; 220/802; 220/562; 220/659; 264/523

(58) Field of Classification Search
CPC ........... B65D 43/0222; B65D 43/0214; B65D 43/0212; B65D 43/0204; B65D 43/0206; B65D 2543/00092; B65D 1/44; B65D 1/46; B65D 1/42; B29C 49/06; B29C 49/02; F16J 15/022; F16J 15/021; B60K 15/0406
USPC ......... 220/803, 802, 801, 796, 795, 792, 790, 220/789, 780, 582, 562, 659, 657, 656, 641, 220/640; 264/523; 428/36.91, 36.9, 35.7; 156/198, 227, 242, 245
See application file for complete search history.

(56) References Cited

U.S. PATENT DOCUMENTS 3,339,231 A * 9/1967 Piotrowski .................... 425/533
4,510,116 A * 4/1985 Peters et al. .................. 264/529

FOREIGN PATENT DOCUMENTS

| JP | 60125624 A * | 7/1985 | .............. B29C 49/04 |
| JP | 560-190651 U | 12/1985 | |
| JP | 2001-140718 A | 5/2001 | |
| JP | 2004-278622 A | 10/2004 | |

OTHER PUBLICATIONS

Translation of JP 60190651 (Oya et al.) Dec. 17, 1985, p. 4.*

* cited by examiner

*Primary Examiner* — Robert J Hicks
(74) *Attorney, Agent, or Firm* — Carrier Blackman & Associates, P.C.; Joseph P. Carrier; Jeffrey T. Gedeon

(57) ABSTRACT

A sealing structure of a fuel tank includes: a hollow circular cylinder part, having an inner circumferential part, formed near opening of the fuel tank to extend outward; a cap body having a hollow cylindrical part inserted into the inner circumferential part to face the inner circumferential part; and a seal member disposed between the inner circumferential part and the hollow cylindrical part. A protruding part is provided on an outer circumferential side of the hollow circular cylinder part of the fuel tank. A locking part formed on an outer circumferential part of the cap body and the protruding parts are fixed.

6 Claims, 10 Drawing Sheets

SEALING STRUCTURE OF FUEL TANK AND VEHICLE PROVIDED WITH SAME

TECHNICAL FIELD

The present invention relates to a sealing structure of a fuel tank for sealing an opening of the fuel tank in a vehicle with, for example, four wheels and to the vehicle including the same.

BACKGROUND ART

There are conventional sealing structures shown in FIGS. 8A to 10B as a sealing structure for an opening which is closed with a cap of a fuel tank for the vehicle with, for example, four wheels.

FIGS. 8A to 10B are cross section views each showing a main part of the conventional sealing structure between a cap of a fuel tank and a fuel tank body.

For example, as shown in FIGS. 8A and 8B, there are sealing structures in which thread parts 101na, 101nb are formed in blow molding of the fuel tanks 101a, 101b made of resin to provide clamping with lock nuts 104a, 104b made of resin (occasionally, metal) through packing 102a, 102b and parts 103a, 103b (in frequent cases, a pump module for suspending a pump for pumping fuel), respectively.

Alternatively, as shown in FIG. 9, there is a sealing structure in which a separated part 206 having a thread part is attached to a fuel tank 201, after the blow molding, made of resin to clamp with a lock nut 204 through a packing 202 and a part 203 such as a pump module, etc.

Alternatively, as respectively, shown in FIGS. 10A and 10B, during blow molding of fuel tanks 301a, 301b made of resin, metal plates 304a, 304b are subjected to insert molding, and sealing is provided by compressing packing 302a, 302b with metal retainers 305a, 305b through the packing 302a, 302b and parts 303a, 303b such as the pump module. This is so-called cam-lock.

For example, there are patent documents regarding the sealing structures of the fuel tank, i.e., Patent documents 1, 2.

PRIOR ART

Patent Document

Patent Document 1: JP 2004-278622 A
Patent Document 2: JP 2001-140718 A

SUMMARY OF INVENTION

Problems to be Solved by Invention

Incidentally, as shown in FIGS. 8A, 8B, and 9, in a structure for compressing packing 102a, 102b, 202 by tightening lock nuts 104a, 104b, 204, axial forces are generated by torques of tightening to provide sealing by compressing the packing 102a, 102b, 202 by the axial forces, respectively. Accordingly, there is a problem in difficulty in controlling because dispersion in the tightening torques for the lock nuts 104a, 104b, 204 should be considered.

On the other hand, in a case of the cam lock structure shown in FIGS. 10A and 10B, compression rates of the packing 302a, 302b can be controlled in only a size dispersion of components. However, there is a problem in that operation is difficult because it is necessary to rotate the retainers 305a, 305b to predetermined positions for locking after generation of the compression rates necessary for sealing the fuel tanks 301a, 301b.

Further, because parts made of metal are used, any structures requiring consideration of rust and static electricity require components for fastening.

Further, when the metal components are electrically charged, a discharge occurs from the charged metal component to a conductive component, so that the fuel tank and the components therearound may be damaged.

In consideration of the circumstances above, the present invention aims to stabilize a quality of a sealing structure for an opening of a fuel tank and provide a sealing structure of the fuel tank having an enhanced assembling efficiency at a low cost and a vehicle including the sealing structure.

Means for Solving Problems

The sealing structure of a fuel tank, defined by claim 1, related to the present invention, includes a hollow circular cylinder part, having an inner circumferential part, formed near opening of the fuel tank to extend outward and a cap body having a hollow cylindrical part inserted into the inner circumferential part to face the inner circumferential part and a seal member disposed between the inner circumferential part and the hollow cylindrical part, and comprises: a protruding part provided on an outer circumferential side of the hollow circular cylinder part of the fuel tank, and a locking part formed on an outer circumferential part of the cap body, wherein the locking part and the protruding part are fixed.

According to the present invention defined by claim 1, it is easy to control sizes of parts around the sealing structure of the fuel tank.

The sealing structure of the fuel tank defined by claim 2 is that, in the present invention defined by claim 1, the protruding part and the locking part are fixed by engagement therebetween, which fixes the cap body to the opening of the fuel tank.

According to the invention defined by claim 2, it is easy to attach and detach the cap body to and from the opening of the fuel tank.

The sealing structure of the fuel tank defined by claim 3 is that in the present invention defined by claim 1 or claim 2, the fuel tank is made of a resin, and the hollow circular cylindrical part of the fuel tank is formed by doubly folding a parison which is a raw material for the fuel tank during molding the fuel tank.

According to the invention defined by claim 3, the circular hollow cylindrical part of the fuel tank can be surely molded by sliding a mold.

The sealing structure of the fuel tank defined by claim 4 is that, in the present invention defined by claim 3, the hollow circular cylindrical part is molded in which a reinforcing member is disposed at the parison doubly folded.

According to the present invention defined by claim 4, it is possible to reinforce the folded part of the circular hollow cylindrical part of the fuel tank.

A vehicle comprising the sealing structure related to the present invention defined by claim 5 has a sealing structure of the fuel tank is that in the present invention defined by any of claim 1, 2, or 4.

The vehicle having the sealing structure defined by claim 6 includes the sealing structure of the fuel tank defined by claim 3.

According to the present invention defined by any of claim 5 or 6, provides a vehicle with a simple dimensional control for parts around the sealing structure of the fuel tank.

Advantageous Effect of Invention

According to the present invention, a quality of a sealing structure for an opening of a fuel tank is stabilized and a sealing structure of the fuel tank having an enhanced assembling efficiency at a low cost and a vehicle including the sealing structure are provided.

MODES FOR CARRYING OUT INVENTION

Hereinafter, will be described embodiments of a present invention with reference to the accompanied drawings.

First Embodiment

Figure 1:
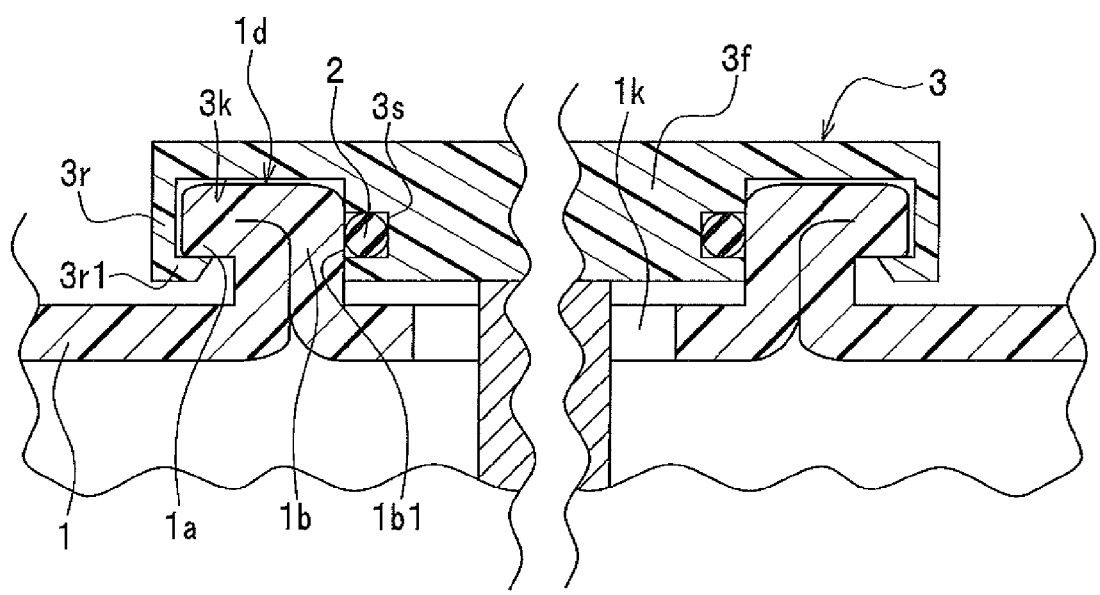
FIG. 1 is a cross section view illustrating a sealing structure for sealing an opening of a fuel tank of a vehicle according to a first embodiment of the present invention.

FIG. 1 is a cross section view illustrating a sealing structure for sealing an opening $1k$ of a fuel tank 1 for a vehicle according to a first embodiment of the present invention.

The fuel tank 1 according to the first embodiment for a vehicle with, for example, four wheels, has a sealing structure for closing and sealing the opening $1k$ with a cap body $3f$ of the pump module 3 for forming the cap.

A pump module 3 functions as a cap for the fuel tank 1 with the cap body $3f$, and a pump (not shown) for pumping fuel in the fuel tank 1 is hanged therefrom.

The fuel tank 1 includes a hollow circular cylinder part $1d$ formed near the opening $1k$ being circular to be closed with the pump module 3. The hollow circular cylinder part $1d$ whose material is doubly folded outward in a diametrical direction, is integrally formed with the fuel tank 1.

The hollow circular cylinder part $1d$ includes a to-be locked part $1a$ on which the pump module 3 is locked and a sealing part $1b$ with a sealing surface $1b1$ for providing sealing when being attached to the pump module 3.

As described above, as shown in FIG. 1, the sealing part $1b$ is formed with a doubly folded part of the material in diametrical direction to have a higher strength.

Figure 2:
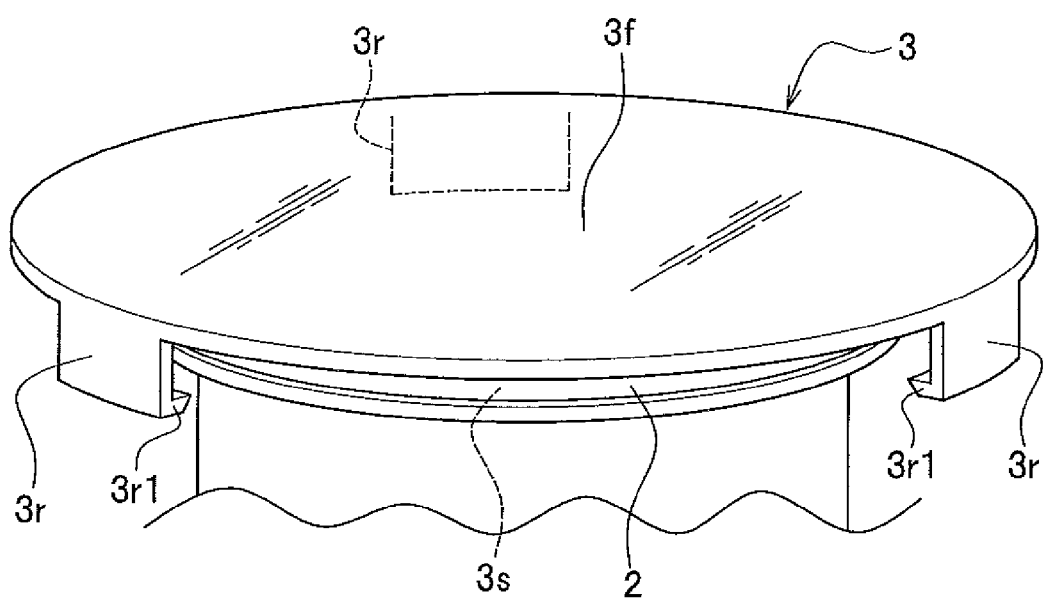
FIG. 2 is a perspective view of a pump module according to the first embodiment viewed from an obliquely upward direction.

FIG. 2 is a perspective view of the pump module according to the first embodiment viewed from an obliquely upward direction.

The pump module 3 is formed with a resin in a shape to have the cap body $3f$ for closing the opening $1k$ of the fuel tank 1, a seal housing hollow part $3s$ in which a seal member 2 such as an O ring is housed, a fitting hollow part $3k$ (see FIG. 1) having a hollow part with a ring shape into which the to-be locked part $1a$ and the sealing part $1b$ of the fuel tank 1 are fitted, and a locking part $3r$ fitted into the to-be locked part $1a$ of the fuel tank 1.

As shown in FIG. 2, the cap body $3f$ of the pump module 3 is formed in a flat circular plate to close the opening $1k$ of the fuel tank 1.

The seal housing hollow part $3s$ of the pump module 3 having a hollow in a cross section formed along an outer circumference of the cap body $3f$ of the pump module 3 for hosing the seal member 2 such as an O ring with a ring shape.

As shown in FIG. 1, the locking parts $3r$ are formed at a plurality of places, for example, three to four places, at an outer circumference of the cap body $3f$ to have a protrusion extending downward. The locking part $3r$ has claws $3r1$ on a lower surface thereof, extending inward to provide a structure in which the claw $3r1$ is fit into the to-be locked part $1a$ of the fuel tank 1 through elastic deformation.

The number of the locking parts $3r$ is not limited but arbitrarily. When the cap body of the pump module 3, etc. is attached to the fuel tank 1 with a hinge, the number may be one. In this case, the pump may be formed not integrally with the cap body.

Next, a method of forming the hollow cylinder part $1d$ near the opening $1k$ of the fuel tank 1 will be described.

In the blow molding for molding the fuel tank 1, near the opening $1k$ of the fuel tank 1, a second mold K2 is pressed against a first mold K1 so that the hollow cylinder part $1d$ including the to-be locked part $1a$ and the sealing part $1b$ with the sealing surface $1b1$.

FIGS. 3A to 3E are cross section views illustrating a process of forming a hollow circular cylinder part $1d$ of the fuel tank 1.

Figure 3A:
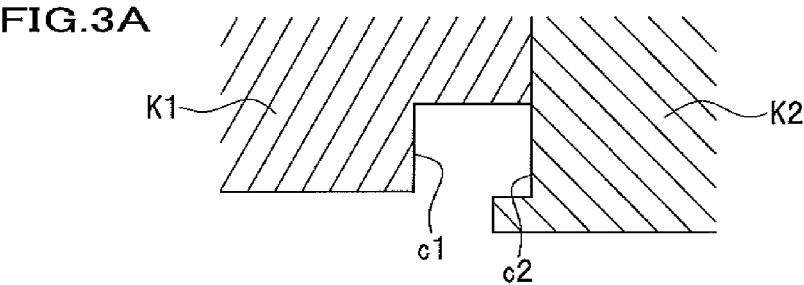
FIGS. 3A to 3E are cross section views illustrating a process of forming a hollow circular cylinder part of the fuel tank.

As shown in FIG. 3A, in the blow molding of the fuel tank 1 (see FIG. 1), the mold K1 and the second mold K2 respectively having cavities c1, c2 for forming the hollow circular cylindrical part $1d$ of the fuel tank 1 are arranged.

Figure 3B:
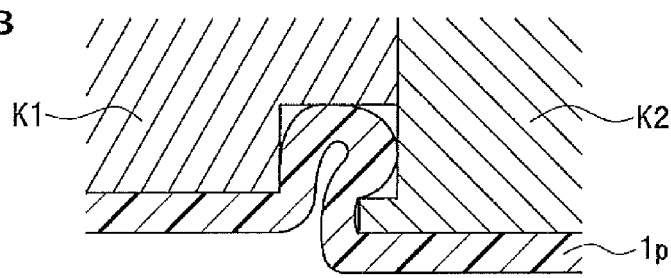

As shown in FIG. 3B, the air is injected into an inside of a parison $1p$ which is a molten resin for blow molding for the fuel tank 1 at a high pressure to cause the parison $1p$ to tightly touch an inner surface of the cavity c1 of the first mold K1 and an inner surface of a cavity c2 of the second mold K2 to form a protruding shape for forming the hollow circular cylinder part $1d$.

Figure 3C:
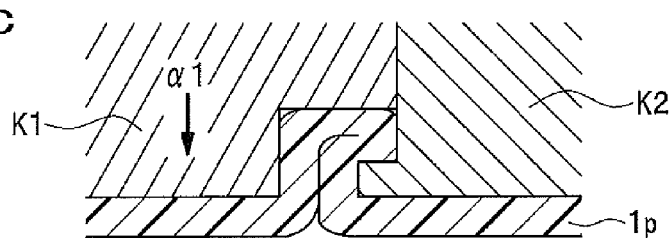

Next, as shown by an arrow α1 in FIG. 3C, pushing (shifting) the first mold K1 forms the shape of the cylinder part $1d$ of the fuel tank 1, and the parison $1p$ is cooled for solidification.

Figure 3D:
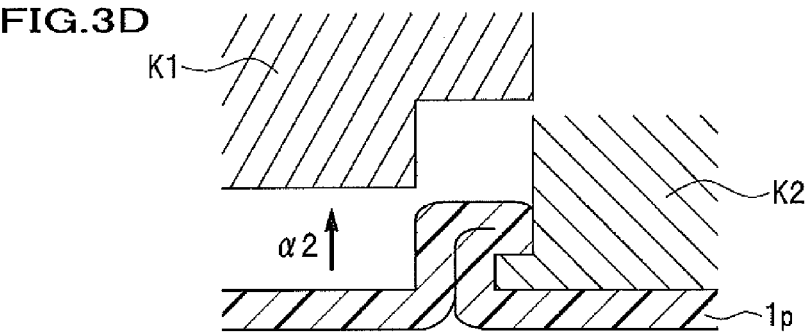
Figure 3E:
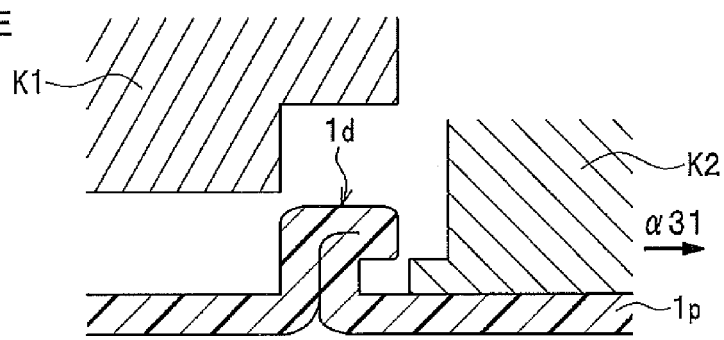

After solidification of the parison $1p$, as shown in FIG. 3D, the first mold K1 is shifted as shown by an arrow α2 and removed therefrom. Next, as shown in FIG. 3A, first the second mold K2 is laterally shifted as shown by the arrow α31 to the hollow circular cylinder part 1d from a position for forming the hollow circular cylinder part 1d of the fuel tank 1, and the second mold K2 is vertically shifted to provide the hollow circular cylinder part 1d of the fuel tank 1 shown in FIG. 1.

This provides a mold of the hollow circular cylinder part 1d with the doubly folded part to have the to-be locked part 1a and the sealing part 1b integrally with the fuel tank 1 during the blow molding of the fuel tank 1. As advantageous effects of shifting the first mold K1 and a mold K2 shown in FIGS. 3A to 3A, a transcriptional property for the mold can be enhanced.

Next, a method of attaching the pump module 3 to the opening 1k of the fuel tank 1 will be described.

Figure 4A:
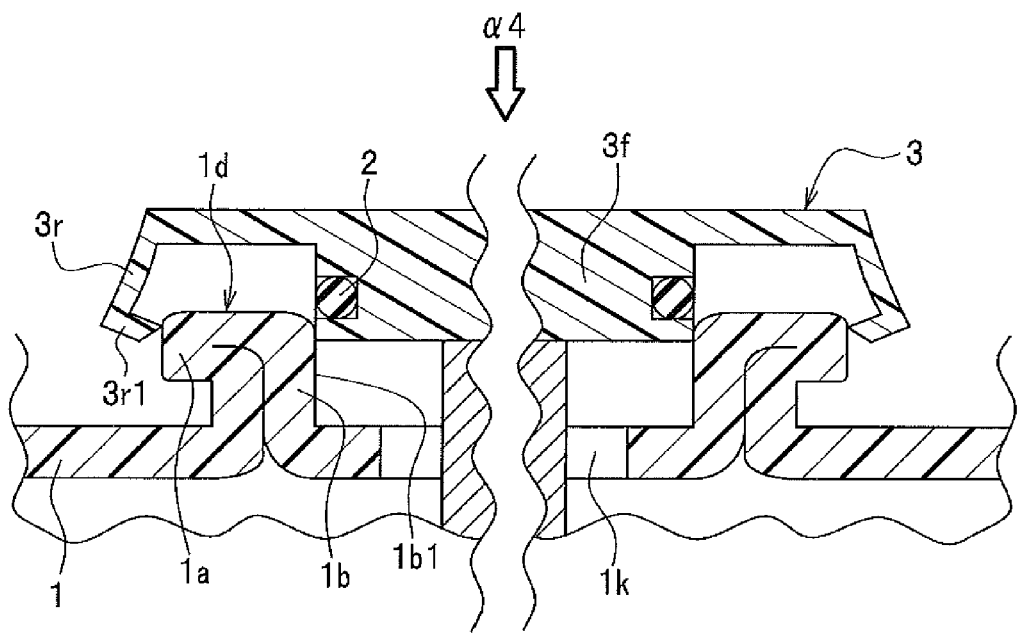
FIGS. 4A and 4B are side cross section views illustrating a process of attaching a pump module to the opening of the fuel tank.
Figure 4B:
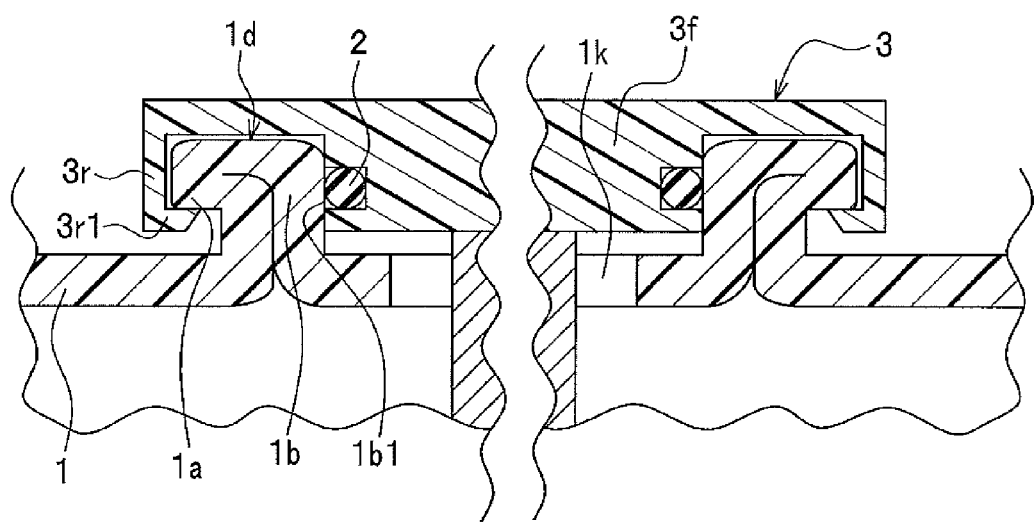

FIGS. 4A and 4B are side cross section views illustrating a process of attaching the pump module 3 to the opening 1k of the fuel tank 1.

First, the pump module 3 in which the seal member 2 such as an O ring is fitted into the seal housing hollow part 3s with the ring shape is pressed as shown by an arrow α4 so that the cap body 3f is fitted into the opening 1k of the fuel tank 1.

Then, the locking parts 3r of the pump module 3 are elastically deformed outward by contact with an outer surface of the to-be locked part 1a of the fuel tank 1.

When the pump module 3 is pressed down toward the opening 1k of the fuel tank 1, as shown by FIG. 4B, the claws 3r1 of a plurality of the locking part 3r of the pump module 3 are fitted into the to-be locked part 1a of the fuel tank 1. In other words, a plurality of the locking parts 3r of the pump module 3 are fixed to the to-be locked parts 1a of the fuel tank 1 with a snap-fit structure.

This allows the pump module 3 to be locked on the opening 1k.

According to the first embodiment, the pump module 3 is locked on the opening 1k of the fuel tank 1 by fitting the pump module 3 into the opening 1k of the fuel tank 1. Accordingly, this eliminates the necessity of a part for engaging the pump module 3 with the fuel tank 1, so that a cost reduction can be expected.

Further, a dimensional control of parts around the sealing structure of the fuel tank 1 becomes easy because of the structure in which the pump module 3 is fitted through the seal member 2 into the opening 1k of the fuel tank 1 to lock the pump module 3 on the fuel tank 1.

Further, the hollow circular cylinder part 1d having the sealing part 1b of the fuel tank 1 is doubly folded in the diametrical direction of the opening 1k, so that a stiffness can be enhanced, which can suppress becoming worth in elasticity (dent) of the resin material and a large deformation due to compressible load of the sealing part 1b.

In addition, the sealing structure of the fuel tank 1 has been changed from the surface seal of the prior art structure to the axial seal in a diametrical direction without a part for engagement, so that the compression rate of the seal member 2 for the packing can be controlled by only the accuracy of the parts. Accordingly, the quality of the sealing structure of the fuel tank 1 can be stabilized, so that an assembling efficiency of the pump module 3 into the fuel tank 1 can be enhanced.

Accordingly, a vehicle can be realized in which, the quality of the sealing structure of the fuel tank 1 can be stabilized and the assembling efficiency of the pump module 3 into the fuel tank 1 can be enhanced.

Second Embodiment

Figure 5:
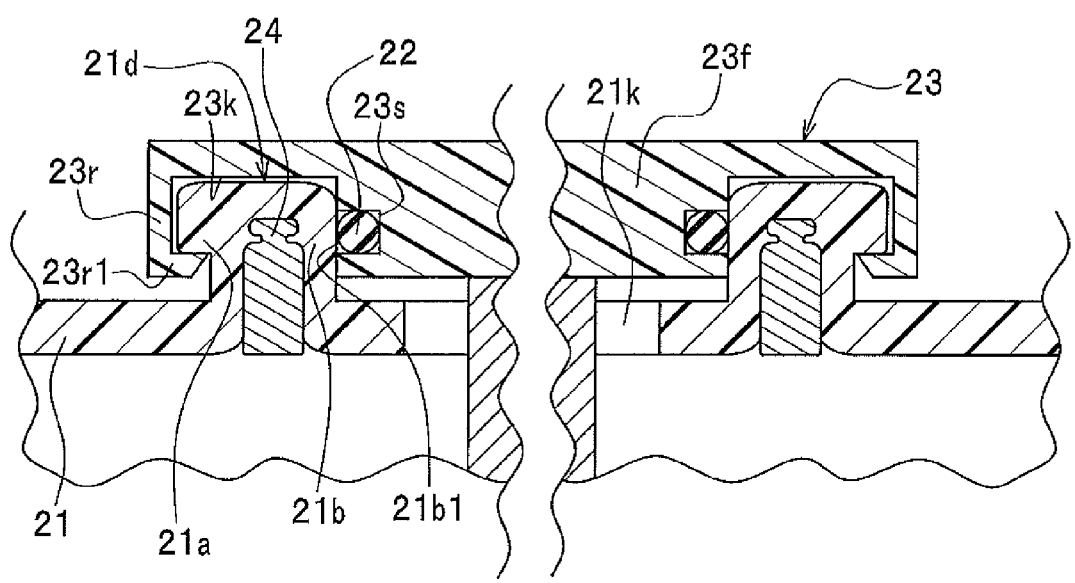
FIG. 5 is a cross section view illustrating a sealing structure according to a second embodiment of the present invention for sealing an opening of the fuel tank for a vehicle with, for example, four wheels.

FIG. 5 is a cross section view illustrating a sealing structure for sealing an opening 21k of a fuel tank 21 for a vehicle with, for example four wheels, according to a second embodiment of the present invention.

The fuel tank 21 according to the second embodiment for the vehicle with, for example, four wheels, has a sealing structure which is obtained by modifying the structure according to the first embodiment in which a hollow circular cylinder part 21d formed near the opening 21k of the fuel tank 21 is configured to have a doubly folded shape in which a reinforcing part 24 is sandwiched between a to-be locked part 21a and a sealing part 21b. Other structures are the same as those in the first embodiment. Accordingly, each corresponding structural element is designated with a reference number obtained by a sum of the reference number of the corresponding structural element in the first embodiment and twenty, and detailed descriptions will be omitted.

Figure 6:
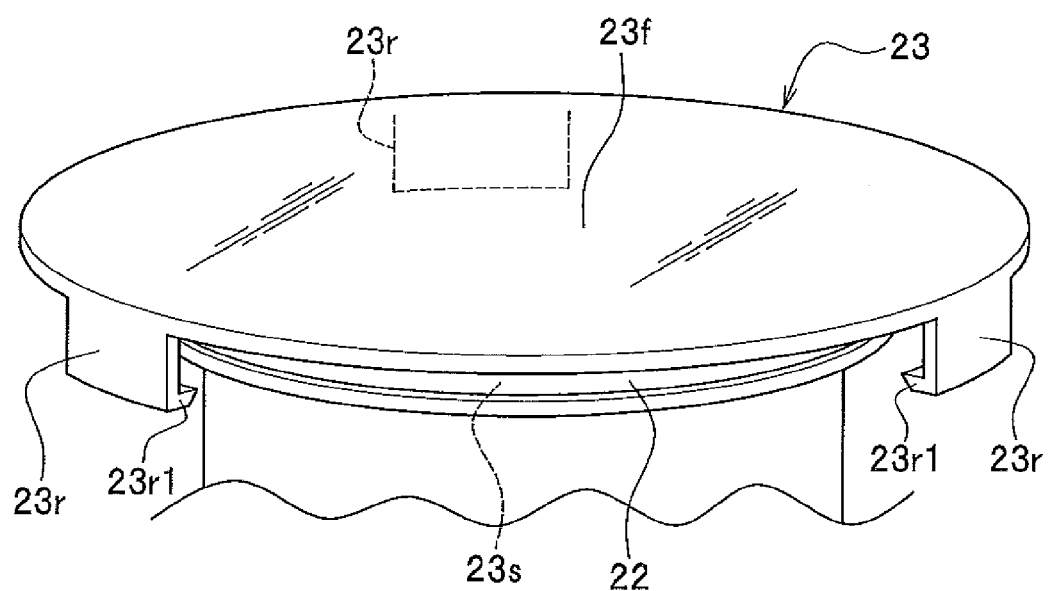
FIG. 6 is a perspective view of a pump module according to the second embodiment viewed from an obliquely upward direction.

FIG. 6 is a perspective view of a pump module 23 according to the second embodiment viewed from an obliquely upward direction.

The opening 21k of the fuel tank 21 is, as similarly shown in FIG. 4 in the first embodiment, is locked because claw s23r1 of a plurality of locking parts 23r are engaged with the to-be locked part 21a of the fuel tank 21.

Next, a method of forming the hollow circular cylinder part 21d in which the reinforcing part 24 for the fuel tank 21 is sandwiched to be held.

As described below, in the blow molding for molding the whole of the fuel tank 21, the hollow circular cylinder part 21d is molded into a doubly folded shape in which the hollow circular cylinder part 21d is sandwiched to be held.

FIGS. 7A to 7D are cross section views illustrating a process of forming the hollow circular cylinder part 21d of the fuel tank 21.

Figure 7A:
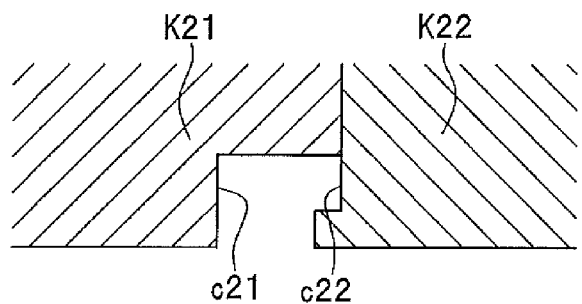
FIGS. 7A to 7D are cross section views illustrating a process of forming a hollow circular cylinder part of the fuel tank.

In a blow molding of the fuel tank 21 (see FIG. 5), first, as shown in FIG. 7A, a first mold K21 and a second mold K22 respectively having cavities c21, c22 for forming the hollow circular cylinder part 21d of the fuel tank 21 are arranged.

Figure 7B:
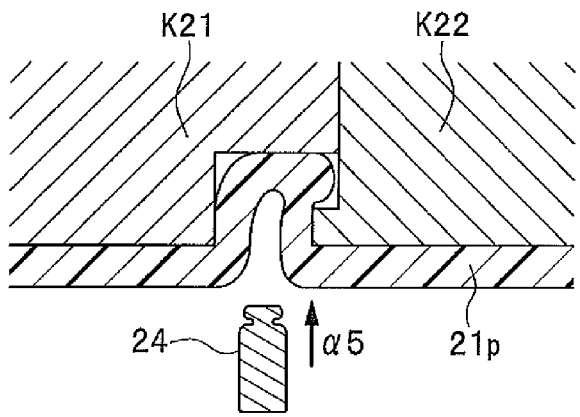
Figure 7C:
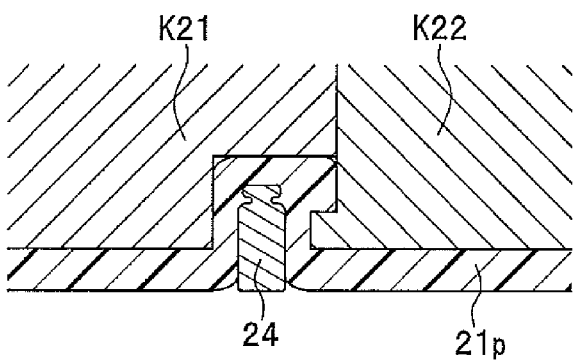

Next, as shown in FIG. 7B, the air is injected into an inside of a parison 21p which is a molten resin for blow molding for the fuel tank 21 at a high pressure to cause the parison 21p to tightly touch an inner surface of the cavity c21 of the first mold K21 and an inner surface of the cavity c22 of the second mold K22 to form a protruding shape for forming the hollow circular cylinder part 21d.

Next, as shown by the arrow α5 in FIG. 7B, after the reinforcing part 24 is inserted into a space between the to-be locked part 21a and the sealing part 21b formed in the hollow circular cylinder part 21d and then, the parison 21p is cooled for solidification.

Figure 7D:
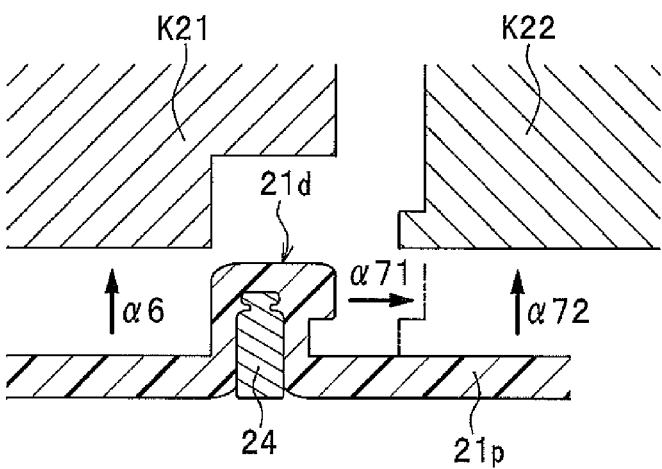
Figure 8A:
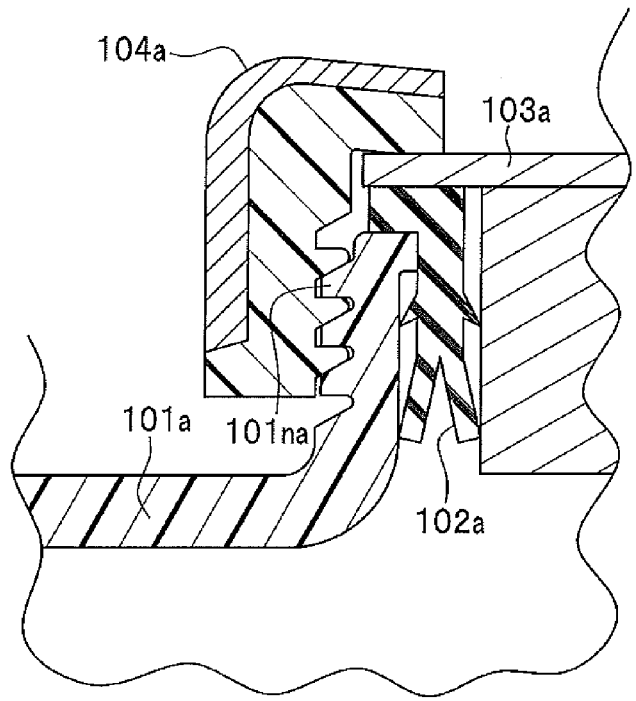
FIGS. 8A and 8B are cross section views each illustrating a main part of a prior art sealing structure between a cap of a fuel tank and a body of the fuel tank.
Figure 8B:
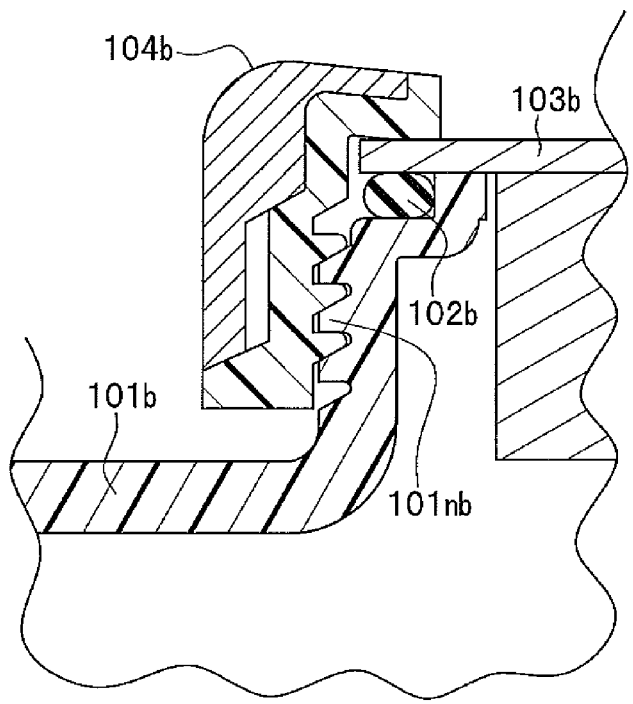
Figure 9:
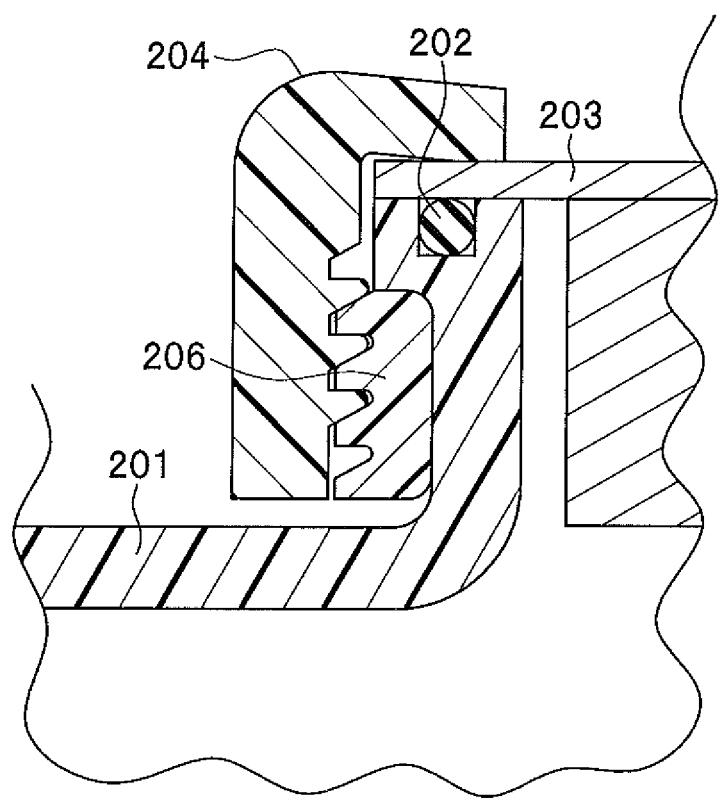
FIG. 9 is a cross section of a main part of a conventional sealing structure between a cap of the fuel tank and a fuel tank body.
Figure 10A:
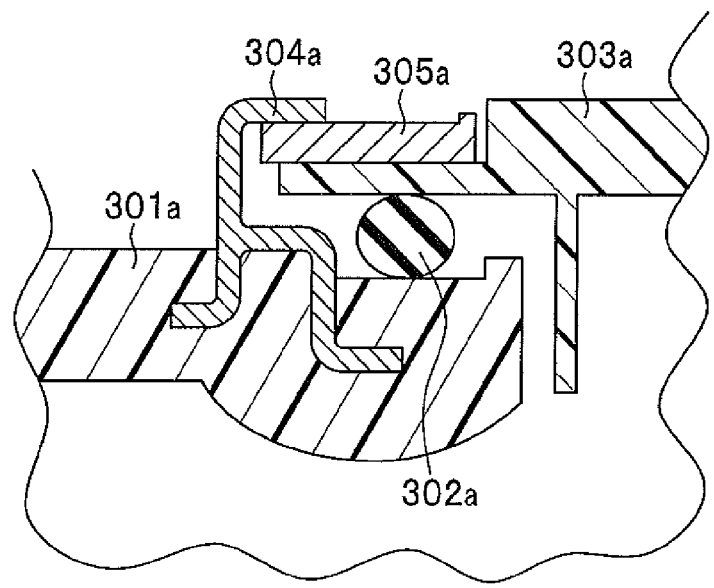
FIGS. 10A and 10B are cross section views each illustrating a conventional sealing structure between the cap of the fuel tank and a body of the fuel tank.
Figure 10B:
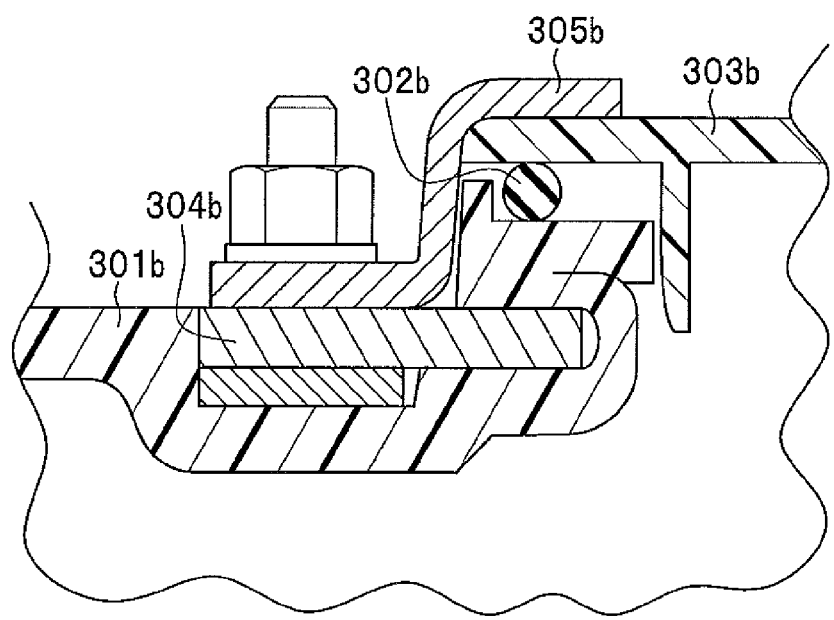

After that, as shown in FIG. 7D, the first mold K21 is shifted as shown by the arrow α6 to remove the first mold K21. At the same time, the second mold K22 is laterally moved as shown by the arrow α71 first to be shifted from the position for molding the hollow circular cylinder part 21d of the fuel tank 21, as shown by an alternate long and two short dashes line. The second mold K22 is vertically moved as shown by an arrow α72 to be removed. This provides molding in which the reinforcing part 24 is arranged inside the hollow circular cylinder part 21d having the doubly folded shape of the fuel tank 21 shown in FIG. 5.

In addition, in the blow molding of the fuel tank 21, there are following two methods of molding the hollow circular cylinder part 21d having the doubly folded shape into which the reinforcing part 24 is inserted into an inside of the hollow circular cylinder part 21d.

The first method is that in a state in which the molds for blow molding of the fuel tank 21 are opened, a pin is pressed on a parison from an inner side to prevent a hollow cylindrical shape from closing. Next, the reinforcing part 24 is inserted into a position where the hollow circular cylinder part 21d is formed with a stick jig through hollow cylinder parison.

Next, the air having a high pressure is injected to the inside of the parison where the reinforcing part 24 is arranged to contact the parison on inner surfaces of the closed molds tightly and is cooled for solidification, so that the fuel tank 21 with the reinforcing part 24 arranged inside the hollow circular cylinder part 21d having the doubly folded shape is completed (molding method by TI-Automotive Limited Company).

The second method is that in a state in which the molds for blow molding of the fuel tank 21 are opened, first the parison having a hollow cylindrical shape is cut and shaped in a sheet shape with a roller. Next, once molding is performed with another mold in the parison. After that, the hollow circular cylinder parts 21d are pressed onto positions to be arranged at the positions where the hollow circular cylinder part 21d is molded in the molded parison.

Next, another mold inside the parison is removed and the molds for blow molding of the fuel tank 21 are closed. The air is injected into the parison inside which the reinforcing parts 24 are arranged to press the parison with tight contact on inner surfaces of the molds for cooling and solidification, so that the fuel tank 21 in which the reinforcing parts 24 are arranged inside the hollow circular cylinder part 21d having the doubly folded shape has been completed (molding method by KAUTEX company, INERGY, L.P).

According to the second embodiment, the sealing part 21b of the fuel tank 21 can be reinforced in a diametrical direction with the reinforcing parts 24 which are pressed on from an inner side of the hollow circular cylinder part 21d of the fuel tank 21. Accordingly, a molding performance (shape reproducing perforce) can be enhanced.

Further, becoming worth in elasticity and deformation in the sealing part 21b of the fuel tank 21 can be suppressed by increase in the stiffness of the hollow circular cylinder part 21d with the reinforcing part 24.

Further, the sealing structure with the pump module 23 for the opening 21k of the fuel tank 21 is modified from the conventional surface seal to the axial seal in a diametrical direction, so that there is no intervening part for engaging. Accordingly, the compression rate of a seal member 22 can be controlled only by accuracy in part, which can stabilize the quality of the sealing structure of the fuel tank 21. In addition, an assembling efficiency of the pump module 23 into the fuel tank 21 can be enhanced.

Accordingly, the quality of the sealing structure of the fuel tank 21 can be stabilized and a vehicle can be realized in which the assembling efficiency of the pump module 23 into the fuel tank 21 is enhanced.

Further, the above-described embodiments have been described on cases where the cap bodies for the fuel tanks 1, 21 are the pump modules 3, 23. However, the cap body may be configured without integrally formed with the pump. As described above, when a cap member similar to the cap bodies in the above-described embodiments, the present invention is applicable to such a cap member without limitation to the embodiments of the pump modules 3, 23.

Further, in the above-described embodiment, the fuel tanks 1, 21 are formed with a resin. However, as long as the fuel tanks 1, 21 function as the described function, any fuel tanks may be used which is made of a metal or a rubber for at least a part thereof. In other words, the fuel tank is not necessarily made of resin.

In addition, the embodiments have described in which the fuel tanks 1, 21 are made by blow molding, but the fuel tank is formed by a method other than the blow molding.

Further, the embodiments have been described on a case where the pump module 3, 23 are made of a resin. However, as long as the functions described above can be carried out, any cap body can be made of a metal or a rubber material, etc. for at least a part thereof.

DESCRIPTION OF REFERENCE SYMBOLS 1, 21 fuel tank
1a, 21a to-be locked part (protruding part)
1b, 21b sealing part
1b1, 21b1 sealing surface (inner circumferential part)
1d, 2d hollow circular cylinder part
1p, 21p parison
2 seal member
3, 23 pump module (cap body)
3f, 23f cap body (hollow cylindrical part)
3r, 23r locking part
24 reinforcing part (reinforcing member)
1k, 21k opening

The invention claimed is:

1. A sealing structure of a resin fuel tank, comprising:
an opening formed in an outer circumferential part,
a hollow circular cylinder part, having an inner circumferential part, formed near the opening to extend outward and,
a hollow cylindrical part inserted into the inner circumferential part such that the hollow cylindrical part has a cap body to face the inner circumferential part and a seal member disposed between the inner circumferential part and the hollow cylindrical part,
wherein the hollow circular cylinder part is formed from molding the resin fuel tank such that resin material is pressed at a cavity arranged in a mold corresponding to an outer circumferential side of the fuel tank,
wherein the hollow circular cylinder part is formed from molding the resin fuel tank such that a parison which is a raw material for the fuel tank is pressed at a cavity arranged in a mold corresponding to an outer circumferential side of the fuel tank so that the parison is doubly folded by blowing air from inside of the parison to the hollow circular cylinder part at time of molding,
wherein the hollow circular cylinder part has a protruding part, which is formed by the cavity, provided on an outer circumferential side of the hollow circular cylinder part of the fuel tank, and a locking part formed on an outer circumferential part of the cap body, and
wherein the locking part and the protruding part are fixed.

2. The sealing structure as claimed in claim 1, wherein the protruding part and the locking part are fixed by fitting therebetween, which fixes the cap body to the opening of the fuel tank.

3. The sealing structure as claimed in claim 1, wherein the hollow circular cylindrical part of the fuel tank is formed during molding the fuel tank by doubly folding a parison which is a raw material for the fuel tank.

4. The sealing structure as claimed in claim 3, wherein a reinforcing member is disposed at a part of the parison doubly folded and the hollow circular cylindrical part is molded.

5. A vehicle comprising the sealing structure as claimed in claim 1.

6. A vehicle comprising the sealing structure as claimed in claim 3.

* * * * *